United States Patent
Hsueh et al.

(10) Patent No.: US 11,947,090 B2
(45) Date of Patent: Apr. 2, 2024

(54) LENS MODULE

(71) Applicants: Sintai Optical (Shenzhen) Co., Ltd., ShenZhen (CN); Asia Optical Co., Inc., Taichung (TW)

(72) Inventors: Chun-Yu Hsueh, Taichung (TW); Tsung-Tse Chen, Taichung (TW); Chun-Hung Huang, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 237 days.

(21) Appl. No.: 17/567,281

(22) Filed: Jan. 3, 2022

(65) Prior Publication Data

US 2022/0252850 A1 Aug. 11, 2022

(30) Foreign Application Priority Data

Feb. 5, 2021 (TW) .................................. 110104459

(51) Int. Cl.
*G02B 15/14* (2006.01)
*G02B 5/08* (2006.01)

(52) U.S. Cl.
CPC .............. *G02B 15/142* (2019.08); *G02B 5/08* (2013.01)

(58) Field of Classification Search
None
See application file for complete search history.

(56) References Cited

U.S. PATENT DOCUMENTS

| 6,178,049 | B1 | 1/2001 | Mukaiya et al. |
| 8,717,683 | B2 | 5/2014 | Toyoda et al. |
| 10,436,954 | B2 | 10/2019 | Shih et al. |
| 10,841,471 | B1 | 11/2020 | Chang et al. |
| 10,948,696 | B2 | 3/2021 | Shabtay et al. |
| 2006/0002694 | A1 | 1/2006 | Mihara et al. |
| 2012/0008214 | A1 | 1/2012 | Toyoda et al. |
| 2021/0157216 | A1* | 5/2021 | Cohen .................. G02B 13/007 |
| 2022/0057610 | A1* | 2/2022 | Kim ....................... G03B 30/00 |

FOREIGN PATENT DOCUMENTS

| CN | 102313973 A | 1/2012 |
| CN | 207181797 U | 4/2018 |
| CN | 109387923 A | 2/2019 |
| CN | 109690380 A | 4/2019 |
| CN | 209375773 U | 9/2019 |
| CN | 110462458 A | 11/2019 |

(Continued)

*Primary Examiner* — Robert E. Tallman
(74) *Attorney, Agent, or Firm* — McClure, Qualey & Rodack, LLP

(57) ABSTRACT

A lens module includes a plurality of lenses, an annular body and a reflective element. The reflective element, the lenses and the annular are sequentially arranged along an optical axis from an object side to an image side. The lenses include a first lens that is disposed closest to the object side, and a second lens that is disposed closest to the image side. The reflective element is disposed between the object side and the first lens. The annular body is disposed between the object side and the first lens, between the lenses, or between the second lens and the image side. The lens module satisfies 0.5 mm<EPA/PL<5.5 mm where EPA is an area of an entrance pupil of the lens module, and PL is a length of the reflective element.

19 Claims, 4 Drawing Sheets

(56) References Cited

FOREIGN PATENT DOCUMENTS

| | | |
|---|---|---|
| CN | 210119621 U | 2/2020 |
| CN | 111948878 A | 11/2020 |
| CN | 212111958 U | 12/2020 |
| CN | 212460156 U | 2/2021 |
| CN | 114153048 A | 3/2022 |
| JP | 2001154277 A | 6/2001 |
| TW | 202001333 A | 1/2020 |

* cited by examiner

LENS MODULE

BACKGROUND OF THE INVENTION

Field of the Invention

The invention relates to a lens module.

Description of the Related Art

For a smart phone, the number of the lenses contained in the lens module is increased to promote the image quality. However, the total length of the lens module is also increased. Therefore, a periscopic lens module is developed to reduce the total length of the lens module. Further, for miniaturization of a smart phone, the thickness of the periscopic lens module is also required to be reduced. Under such circumstance, the traditional aperture that is circular is necessarily reduced in size. As a result, the amount of light entering the lens module is also reduced. To address the problem, the aperture is modified to be non-circular, for example, shaped like a track of sports field. However, when the thickness of a smart phone is reduced to an extent that requires the non-circular aperture to be further flattened, the amount of light entering the non-circular aperture at the short side is significantly less than that at the long side. As a result, the brightness of the image formed at the short side is obviously less than that at the long side. That is, the brightness of the image formed is not uniform, so as to affect the image quality.

BRIEF SUMMARY OF THE INVENTION

The invention provides a lens module which includes a variable light-shielding flat piece to control the amount of light entering the aperture at the long side thereof. By such arrangement, the difference between the amount of light entering the aperture at the long side and that at the short side can become reduced, thereby improving the uniformity of brightness of the images.

The lens module in accordance with an exemplary embodiment of the invention includes a plurality of lenses, an annular body and a reflective element. The reflective element, the lenses and the annular body are sequentially arranged along an optical axis from an object side to an image side. The reflective element is disposed between the object side and the lenses, and the reflective element includes a reflective surface. The annular body is disposed between the object side and the lenses, between the lenses, or between the lenses and the image side. The lens module satisfies 0.5 mm<EPA/PL<5.5 mm where EPA is an area of an entrance pupil of the lens module, and PL is a length of the reflective element, the reflective surface comprises a side, the length of the reflective element equals a length of the side of the reflective surface, and the side of the reflective surface is perpendicular to the optical axis.

In another exemplary embodiment, the lenses include a first lens that is disposed closest to the object side, and a second lens that is disposed closest to the image side, the reflective element is disposed between the object side and the first lens, and the annular body is disposed between the object side and the first lens, between the lenses, or between the second lens and the image side.

In yet another exemplary embodiment, the annular body is an aperture or a light-shielding element, the light-shielding element includes an action element, a variable hole and a driving element, and the action element surrounds the optical axis to form the variable hole and is driven by the driving element to change an inner diameter of the variable hole.

In another exemplary embodiment, at least one of the lenses is movable so that the lens module can zoom, and the action element is driven to change the inner diameter of the variable hole when the lens module zooms.

In yet another exemplary embodiment, the aperture has a fixed size.

In another exemplary embodiment, the light-shielding element is movable along the optical axis.

In yet another exemplary embodiment, the action element is a non-circular sheet.

In another exemplary embodiment, the variable hole is non-circular.

In yet another exemplary embodiment, the variable hole is in a shape of polygon, polygon with sides symmetrically arranged with respect to the optical axis, polygon with sides asymmetrically arranged with respect to the optical axis, track of sports field, bottle, oak-barrel, waves, flower, leaf, cloud, star, serration, or heart.

In another exemplary embodiment, the variable hole is in a shape that includes a straight line and an arc.

In yet another exemplary embodiment, the variable hole is in an irregular shape that consists of lines connected to each other.

In another exemplary embodiment, the lens module satisfies at least one of following conditions: 0.2<SDX/STD<2; 0<SDY/STD<1.2; 0.2<EPDX/STD<2.1; 0<EPDY/STD<1.5; 0.7 mm<EPA/STD<10 mm, where SDX is a maximum dimension of the variable hole measured across the optical axis, SDY is a minimum dimension of the variable hole measured across the optical axis, STD is a diameter of the aperture, EPDX is a maximum dimension of the entrance pupil measured across the optical axis, EPDY is a minimum dimension of the entrance pupil measured across the optical axis, and EPA is the area of the entrance pupil of the lens module.

In yet another exemplary embodiment, the lens module satisfies at least one of following conditions: 0<SDX/EPDX<1.6 and 0.5<SDY/EPDY<2.3, where SDX is a maximum dimension of the variable hole measured across the optical axis, SDY is a minimum dimension of the variable hole measured across the optical axis, EPDX is a maximum dimension of the entrance pupil measured across the optical axis, and EPDY is a minimum dimension of the entrance pupil measured across the optical axis.

In another exemplary embodiment, the lens module satisfies at least one of following conditions: 1 mm<SA/STD<9 mm and 0.4<SA/EPA<2.4, where SA is an area of the variable hole of the light-shielding element, STD is a diameter of the aperture, and EPA is the area of the entrance pupil of the lens module.

In yet another exemplary embodiment, the reflective element further includes an incident surface and an emitting surface which are perpendicular to each other.

In another exemplary embodiment, the lens module satisfies at least one of following conditions: 0.8<PL/EPDX<4 and 0.7<PH/EPDY<3, where PL is the length of the reflective element, PH is a height of the reflective element that equals a length of a side of the emitting surface wherein the side of the emitting surface is perpendicular to the incident surface, EPDX is a maximum dimension of the entrance pupil measured across the optical axis, and EPDY is a minimum dimension of the entrance pupil measured across the optical axis.

In yet another exemplary embodiment, the lens module satisfies at least one of following conditions: $0.8<(SDY+EPDY)/PH<2$; $0.5<(SDX+EPDX)/PL<2.2$; $2<(SDX/SDY)+(EPDX/EPDY)+(PL/PH)<6.5$, where SDX is a maximum dimension of the variable hole measured across the optical axis, SDY is a minimum dimension of the variable hole measured across the optical axis, EPDX is a maximum dimension of the entrance pupil measured across the optical axis, EPDY is a minimum dimension of the entrance pupil measured across the optical axis, PL is the length of the reflective element, and PH is a height of the reflective element that equals a length of a side of the emitting surface wherein the side of the emitting surface is perpendicular to the incident surface.

In another exemplary embodiment, the inner diameter of the variable hole is changed in accordance with different focal lengths.

In yet another exemplary embodiment, the shape of the action element may consist of a plurality of line segments, may consist of a plurality of arcs, may consist of line segments and arcs, may consist of a plurality of curved lines, or may consist of line segments, arcs and curved lines.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The invention provides a lens module that includes a plurality of lenses, an annular body and a reflective element. The reflective element, the lenses and the annular body are sequentially arranged along an optical axis from an object side to an image side. The lenses include a first lens that is closest to the object side, and a second lens that is closest to the image side. The reflective element is disposed between the object side and the first lens and has a reflective surface. The annular body is disposed between the object side and the first lens, between the lenses, or between the second lens and the image side. The lens module satisfies the condition 0.5 mm<EPA/PL<5.5 mm, where EPA is an area of an entrance pupil of the lens module, and PL is a length of the reflective element. The length of the reflective element equals a length of a side of the reflective surface, and the side of the reflective surface is perpendicular to the optical axis.

Figure 1:
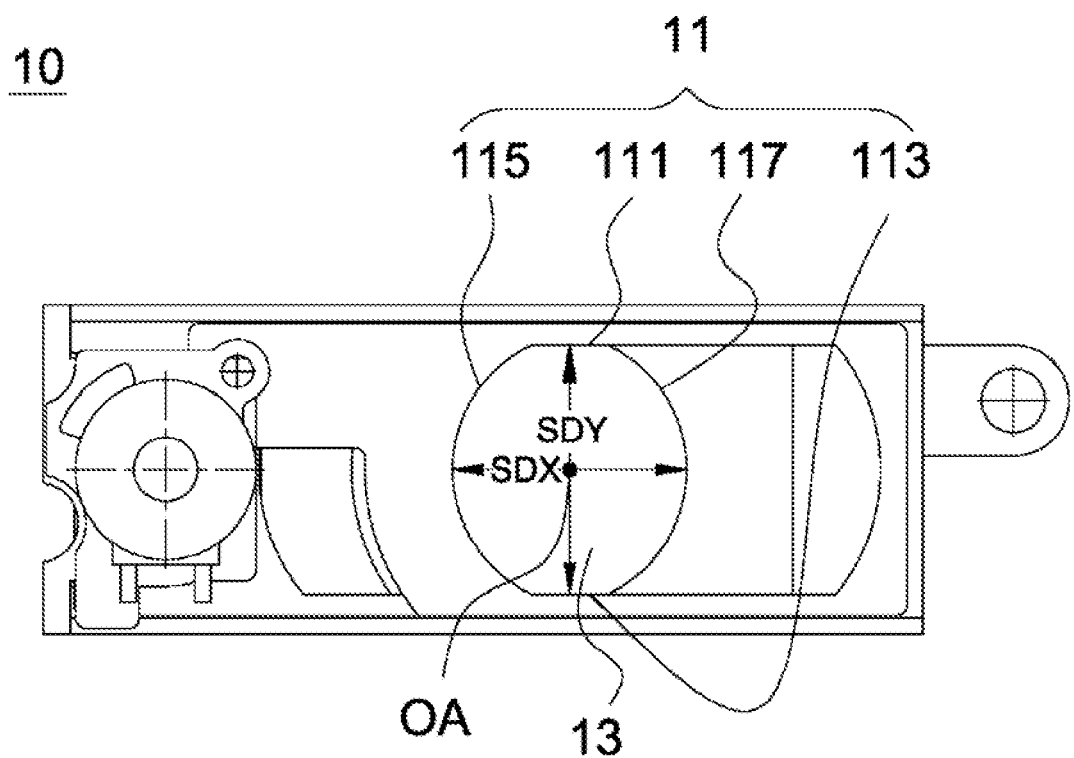
FIG. 1 depicts a lens module at a wide-angle end in accordance with the invention wherein a variable light-shielding element of the lens module is configured to provide a small caliber.
Figure 2:
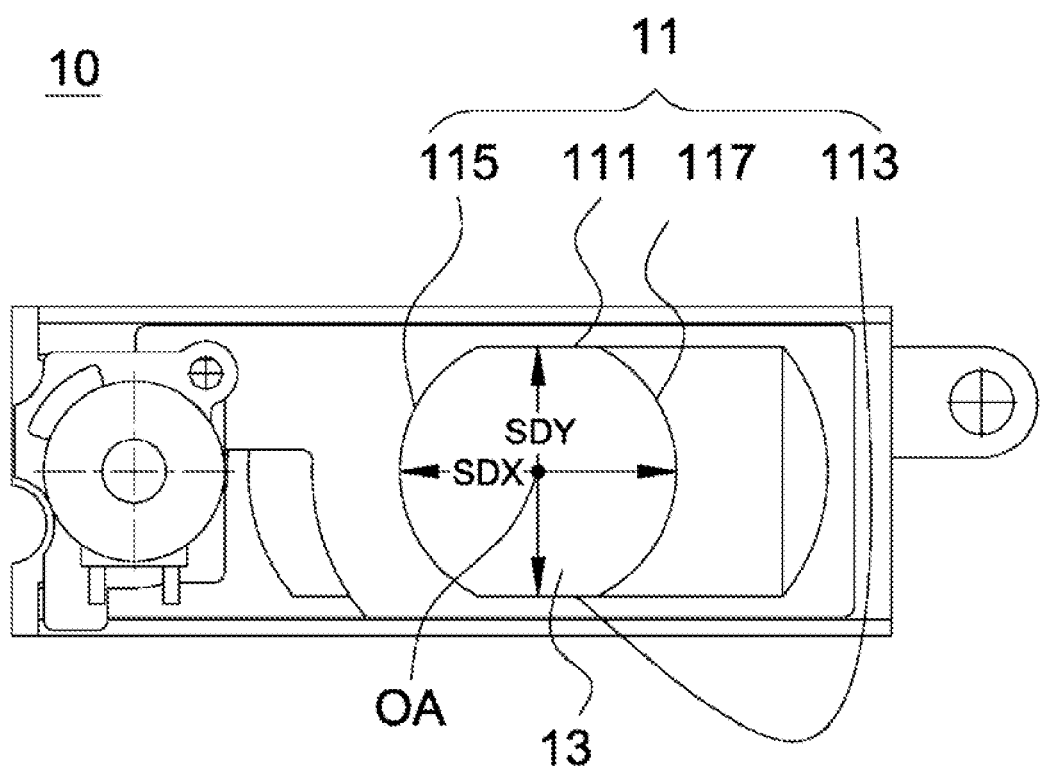
FIG. 2 depicts the lens module at a medium end in accordance with the invention wherein the variable light-shielding element of the lens module is configured to provide a medium caliber.
Figure 3:
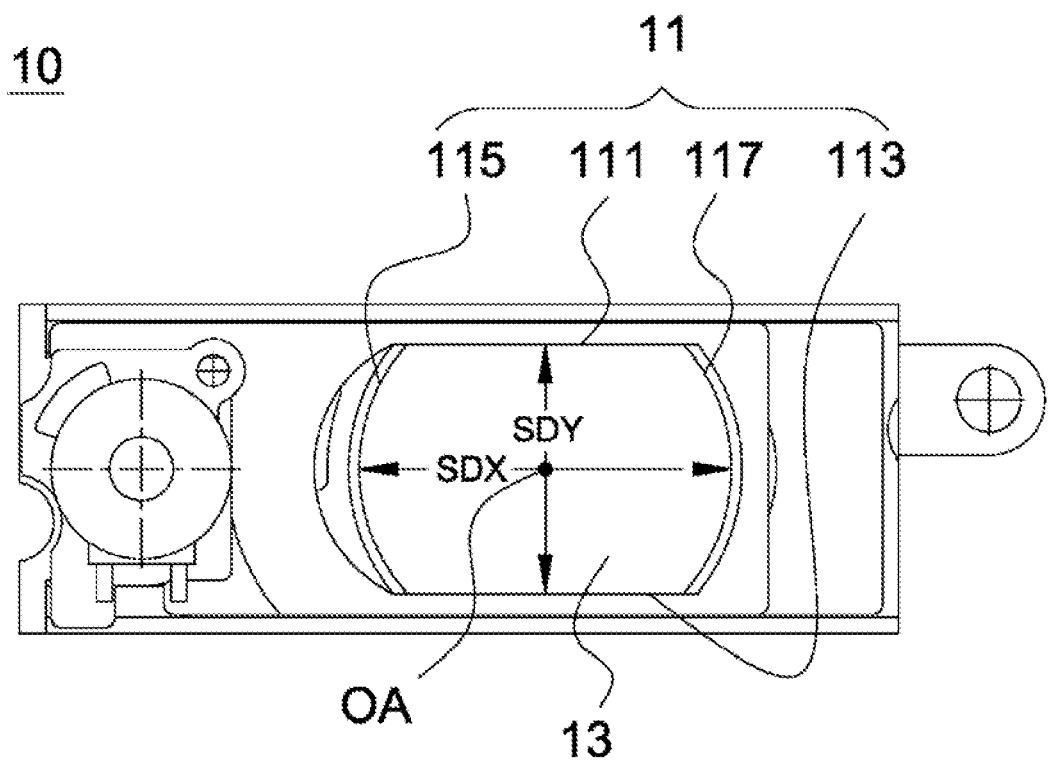
FIG. 3 depicts the lens module at a telephoto end in accordance with the invention wherein the variable light-shielding element of the lens module is configured to provide a large caliber.
Figure 4:
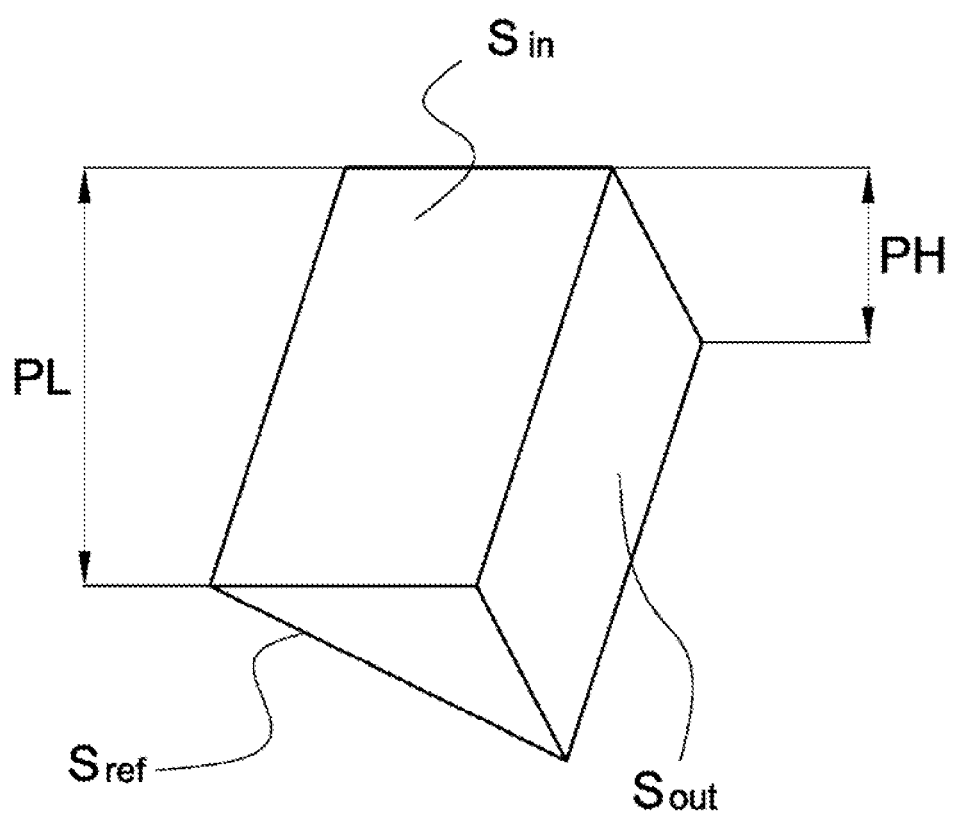
FIG. 4 is a schematic diagram of a reflective element of the lens module in accordance with the invention.

FIGS. 1-3 respectively depict a lens module at a telephoto end, a medium end and a wide-angle end in accordance with an embodiment of the invention wherein a variable light-shielding element of the lens module is configured to respectively provide a large caliber, a medium caliber and a small caliber. FIG. 4 is a schematic diagram of a reflective element of the lens module in accordance with an embodiment of the invention. The lens module (not shown) of the invention includes a plurality of lenses (not shown), a plurality of annular bodies (not shown), and a reflective element 20. The annular body may be an aperture (not shown) or a light-shielding element. In this embodiment, the light-shielding element is a variable light-shielding flat piece 10 as shown in FIGS. 1-3. The variable light-shielding flat piece 10 is used as a representative element of the annular body or the light-shielding element hereinafter. A plurality of lenses (not shown), an aperture (not shown), a variable light-shielding flat piece 10 and a reflective element 20 are sequentially arranged along an optical axis OA. The aperture (not shown) is disposed between the lenses (not shown) and the variable light-shielding flat piece 10 is also disposed between the lenses (not shown). However, the invention is not limited thereto. The aperture (not shown) may be disposed between an object side (not shown) and the lens closest to the object side. The variable light-shielding flat piece 10 may be disposed between the object side (not shown) and the lens (not shown) closest to the object side (not shown), or disposed between an image side (not shown) and the lens (not shown) closest to the image side (not shown). The reflective element 20 is disposed between the object side (not shown) and the image side (not shown). That is, the reflective element 20 may be disposed between the object side (not shown) and the lens (not shown) closest to the object side (not shown), disposed between the lenses (not shown), or disposed between the lens (not shown) closest to the image side (not shown) and the image side (not shown). At least one of the lenses is movable to perform zoom operation or focusing operation. The aperture (not shown) has a hole which has a fixed size.

The variable light-shielding flat piece 10 includes an action element 11, a variable hole 13 and a driving element (not shown). The variable light-shielding flat piece 10 is movable along the optical axis OA, with the inner diameter of the variable hole 13 changed in accordance with different focal lengths. The action element 11 is a non-circular flat body, the shape of which has a line segment 111, a line segment 113, an arc 115 and an arc 117. The two ends of the line segment 111 are respectively connected to an end of the arc 115 and an end of the arc 117, while the two ends of the line segment 113 are respectively connected to the other end of the arc 115 and the other end of the arc 117. Accordingly, the line segment 111 is opposite to the line segment 113 and the arc 115 is opposite to the arc 117. The action element 11 is configured to surround the optical axis OA so as to define the variable hole 13. The action element 11 can be driven by the driving element (not shown) to change the inner diameter thereof. The driving element (not shown) may be an electric driving motor, a step motor, a magnet-coil assembly, a voice coil motor, a piezoelectric material, a shape memory alloy (SMA) and so on. When the dimensions of the action element 11 are changed (i.e. the inner diameter and shape of the action element 11 are changed), the dimensions of the variable hole 13 are changed. In this embodiment, the action element is in a shape consisting of two line segments and two arcs. However, the invention is not limited thereto. In the invention, the shape of the action element may consist of a plurality of line segments, may consist of a plurality of arcs, may consist of line segments and arcs, may consist of a plurality of curved lines, or may consist of line segments, arcs and curved lines. The variable hole 13 is non-circular.

When observed along the optical axis, the variable hole 13 is in a shape formed by placing two letters "U" and "U" with their openings towards each other and connecting them. However, the invention is not limited thereto. In the invention, the variable hole may be in a shape of polygon, polygon with sides symmetrically arranged with respect to the optical axis, polygon with sides asymmetrically arranged with respect to the optical axis, track of sports field, bottle, oak-barrel, waves, flower, leaf, cloud, star, serration, or heart, may be in a shape having a straight line and an arc, or may be in an irregular shape that consists of lines connected to each other. By such a design, the size, thickness and volume of the lens module can be effectively reduced. In particular, when the variable hole is in a shape of waves, cloud, star or serration, both the stray light and ghost image can be reduced. The maximum dimension of the variable hole measured across the optical axis is labeled SDX. The minimum dimension of the variable hole measured across the optical axis is labeled SDY. From FIGS. 1-3, it can be easily observed that the maximum dimension SDX of the variable hole is gradually increased from the smallest to the greatest when the lens module operates from the wide-angle end through the medium end to the telephoto end. It can be also observed that the minimum dimension SDY of the variable hole is less changed when the lens module operates from the wide-angle end through the medium end to the telephoto end. The aperture (not shown) and the variable hole 13 are provided for allowing light from the object side (not shown) to pass therethrough. The dimensions of the aperture (not shown) and the variable hole 13 are dominant for the amount of light passing through the lens module (not shown), and therefore influence the F-number and image quality. In this embodiment, the reflective element 20 is a prism including an incident surface $S_{in}$, a reflective surface $S_{ref}$ and an emitting surface $S_{out}$. The reflective surface $S_{ref}$ has a side and the side of the reflective surface $S_{ref}$ is perpendicular to the optical axis. The reflective element 20 has a length PL that equals the length of the side of the reflective surface $S_{ref}$. The emitting surface $S_{out}$ has a side that is perpendicular to the incident surface $S_{in}$. The reflective element 20 has a height PH that equals the length of the side of the emitting surface $S_{out}$. In operation, light coming from the object side (not shown) is incident on the incident surface $S_{in}$, is reflected on the reflective surface $S_{ref}$ to change the travel direction, and exits from the emitting surface $S_{out}$ of the reflective element 20. The incident surface $S_{in}$ and the emitting surface $S_{out}$ are perpendicular to each other. The reflective element 20 may be a reflective mirror which is merely a reflective surface, instead of the prism described above.

In the invention, the lens module (not shown) satisfies at least one of the following conditions:

$$0.7 \text{ mm} < EPA/STD < 10 \text{ mm} \tag{1}$$

$$0.2 < SDX/STD < 2 \tag{2}$$

$$0 < SDY/STD < 1.2 \tag{3}$$

$$0.2 < EPDX/STD < 2.1 \tag{4}$$

$$0 < EPDY/STD < 1.5 \tag{5}$$

$$0 < SDX/EPDX < 1.6 \tag{6}$$

$$0.5 < SDY/EPDY < 2.3 \tag{7}$$

$$1 \text{ mm} < SA/STD < 9 \text{ mm} \tag{8}$$

$$0.4 < SA/EPA < 2.4 \tag{9}$$

$$0.8 < PL/EPDX < 4 \tag{10}$$

$$0.7 < PH/EPDY < 3 \tag{11}$$

$$0.8 < (SDY+EPDY)/PH < 2 \tag{12}$$

$$0.5 < (SDX+EPDX)/PL < 2.2 \tag{13}$$

$$2 < (SDX/SDY)+(EPDX/EPDY)+(PL/PH) < 6.5 \tag{14}$$

$$0.5 \text{ mm} < EPA/PL < 5.5 \text{ mm} \tag{15}$$

where EPA is an area of the entrance pupil of the lens module (i.e. the area defined by the entrance pupil), STD is a diameter of the aperture, SDX is a maximum dimension of the variable hole measured across the optical axis, SDY is a minimum dimension of the variable hole measured across the optical axis, EPDX is a maximum dimension of the entrance pupil measured across the optical axis, EPDY is a minimum dimension of the entrance pupil measured across the optical axis, SA is an area of the variable hole of the variable light-shielding flat piece (i.e. the area defined by the variable hole), PL is the length of the reflective element that equals a length of a side of the reflective surface $S_{ref}$ (the side is perpendicular to the optical axis), and PH is a height of the reflective element that equals a length of a side of the emitting surface $S_{out}$ (the side is perpendicular to the incident surface $S_{in}$).

By means of the above-mentioned lenses (not shown), aperture (not shown), variable light-shielding flat piece 10, reflective element 20, and at least one of the conditions (1)-(15) satisfied, the total length and thickness of the lens module (not shown) can be effectively reduced and the uniformity of brightness of images can be effectively promoted.

When the conditions (1) and (9), namely 0.7 mm<EPA/STD<10 mm and 0.4<SA/EPA<2.4, are satisfied, the amount of light that enters the lens module can be effectively increased and the brightness of the images can be promoted.

When the conditions (2) and (3), namely 0.2<SDX/STD<2 and 0<SDY/STD<1.2, are satisfied, the size and thickness of the lens module can be effectively reduced, the maximum dimension of the variable hole and the minimum dimension of the variable hole of the variable light-shielding flat piece can be simultaneously controlled, and the uniformity of brightness of images can be promoted.

When the conditions (4)-(7), namely 0.2<EPDX/STD<2.1, 0<EPDY/STD<1.5, 0<SDX/EPDX<1.6 and 0.5<SDY/EPDY<2.3, are satisfied, the amount of light entering the lens module can be effectively controlled, the brightness of images can be promoted, the difference between the relative illuminations in the two directions in which the maximum and minimum dimensions of the entrance pupil are respectively obtained can be under controlled without affecting the image forming, and the difference between the relative illuminations in the two directions in which the maximum and minimum dimensions of the variable hole are respectively obtained can be also under controlled without affecting the image forming.

When the conditions (10), (11) and (15), namely 0.8<PL/EPDX<4, 0.7<PH/EPDY<3, and 0.5 mm<EPA/PL<5.5 mm, are satisfied, the proportion of the length of the reflective element to the maximum dimension of the entrance pupil can be effectively controlled, the proportion of the height of the reflective element to the minimum dimension of the entrance pupil can be effectively controlled, and the proportion of area of the entrance pupil to the length of the reflective element can be effectively controlled. It is advantageous to reduce the thickness of the lens module. Further, miniaturization of the lens module can be achieved while the lens module is capable of good optical performance.

Table 1 shows the data of the lens module of a first embodiment at a wide-angle end and the calculation results in accordance the conditions (1)-(15). From Table 1, it is found that the lens module (not shown) of the first embodiment at a wide-angle end can satisfy all the conditions (1)-(15).

TABLE 1

| EPA | 8.835 mm² | STD | 5.52 mm | SDX | 4.29 mm |
|---|---|---|---|---|---|
| SDY | 4.29 mm | EPDX | 3.43 mm | EPDY | 3.048 mm |
| SA | 14.45455 mm² | PL | 10.8 mm | PH | 6.4 mm |
| EPA/STD | 1.60 mm | SDX/STD | 0.78 | SDY/STD | 0.78 |
| EPDX/STD | 0.62 | EPDY/STD | 0.55 | SDX/EPDX | 1.25 |
| SDY/EPDY | 1.41 | SA/STD | 2.62 mm | SA/EPA | 1.64 |
| PL/EPDX | 3.15 | PH/EPDY | 2.10 | (SDY + EPDY)/PH | 1.15 |
| (SDX + EPDX)/PL | 0.71 | (SDX/SDY) + (EPDX/EPDY) + (PL/PH) | | | 3.81 |
| EPA/PL | 0.82 mm | | | | |

Table 2 shows the data of the lens module of the first embodiment at a medium end and the calculation results in accordance the conditions (1)-(15). From Table 2, it is found that the lens module (not shown) of the first embodiment at a medium end can satisfy all the conditions (1)-(15).

TABLE 2

| EPA | 25.573 mm² | STD | 5.52 mm | SDX | 5.186 mm |
|---|---|---|---|---|---|
| SDY | 4.7 mm | EPDX | 5.724 mm | EPDY | 5.552 mm |
| SA | 20.406 mm² | PL | 10.8 mm | PH | 6.4 mm |
| EPA/STD | 4.63 mm | SDX/STD | 0.94 | SDY/STD | 0.85 |
| EPDX/STD | 1.04 | EPDY/STD | 1.01 | SDX/EPDX | 0.91 |
| SDY/EPDY | 0.85 | SA/STD | 3.70 mm | SA/EPA | 0.80 |
| PL/EPDX | 1.89 | PH/EPDY | 1.15 | (SDY + EPDY)/PH | 1.60 |
| (SDX + EPDX)/PL | 1.01 | (SDX/SDY) + (EPDX/EPDY) + (PL/PH) | | | 3.82 |
| EPA/PL | 2.37 mm | | | | |

Table 3 shows the data of the lens module of the first embodiment at a telephoto end and the calculation results in accordance the conditions (1)-(15). From Table 3, it is found that the lens module (not shown) of the first embodiment at a telephoto end can satisfy all the conditions (1)-(15).

TABLE 3

| EPA | 47.530 mm² | STD | 5.52 mm | SDX | 9 mm |
|---|---|---|---|---|---|
| SDY | 4.7 mm | EPDX | 9.1 mm | EPDY | 5.6 mm |
| SA | 40.290 mm² | PL | 10.8 mm | PH | 6.4 mm |
| EPA/STD | 8.61 mm | SDX/STD | 1.63 | SDY/STD | 0.85 |
| EPDX/STD | 1.65 | EPDY/STD | 1.01 | SDX/EPDX | 0.99 |
| SDY/EPDY | 0.84 | SA/STD | 7.30 mm | SA/EPA | 0.85 |
| PL/EPDX | 1.19 | PH/EPDY | 1.14 | (SDY + EPDY)/PH | 1.61 |
| (SDX + EPDX)/PL | 1.68 | (SDX/SDY) + (EPDX/EPDY) + (PL/PH) | | | 5.23 |
| EPA/PL | 4.40 mm | | | | |

In the above embodiment, the lens module is a zoom lens module. However, it is understood the invention is applicable to a prime lens module, i.e. fixed-focus lens module. That is, a prime lens module also belongs to the category of the invention.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens module, comprising:
   a plurality of lenses;
   an annular body; and
   a reflective element;
   wherein the reflective element, the lenses and the annular body are sequentially arranged along an optical axis from an object side to an image side;
   wherein the reflective element is disposed between the object side and the lenses, and the reflective element comprises a reflective surface;
   wherein the annular body is disposed between the object side and the lenses, between the lenses, or between the lenses and the image side;
   wherein the annular body is an aperture or a light-shielding element, the light-shielding element comprises an action element, a variable hole and a driving element, and the action element surrounds the optical axis to form the variable hole and is driven by the driving element to change an inner diameter of the variable hole;

wherein the lens module satisfies 0.5 mm<EPA/PL<5.5 mm where EPA is an area of an entrance pupil of the lens module, and PL is a length of the reflective element, the reflective surface comprises a side, the length of the reflective element equals a length of the side of the reflective surface, and the side of the reflective surface is perpendicular to the optical axis.

2. The lens module as claimed in claim 1, wherein the lenses include a first lens that is disposed closest to the object side, and a second lens that is disposed closest to the image side, the reflective element is disposed between the object side and the first lens, and the annular body is disposed between the object side and the first lens, between the lenses, or between the second lens and the image side.

3. The lens module as claimed in claim 1, wherein the lens module satisfies at least one of following conditions:

$0<SDX/EPDX<1.6$;

$0.5<SDY/EPDY<2.3$;

where SDX is a maximum dimension of the variable hole measured across the optical axis, SDY is a minimum dimension of the variable hole measured across the optical axis, EPDX is a maximum dimension of the entrance pupil measured across the optical axis, and EPDY is a minimum dimension of the entrance pupil measured across the optical axis.

4. The lens module as claimed in claim 1, wherein the lens module satisfies at least one of following conditions:

1 mm$<SA/STD<$9 mm;

$0.4<SA/$EPA$<2.4$;

where SA is an area of the variable hole of the light-shielding element, STD is a diameter of the aperture, and EPA is the area of the entrance pupil of the lens module.

5. The lens module as claimed in claim 1, wherein the reflective element further comprises an incident surface and an emitting surface which are perpendicular to each other.

6. The lens module as claimed in claim 5, wherein the lens module satisfies at least one of following conditions:

$0.8<(SDY+EPDY)/PH<2$;

$0.5<(SDX+EPDX)/PL<2.2$;

$2<(SDX/SDY)+(EPDX/EPDY)+(PL/PH)<6.5$;

where SDX is a maximum dimension of the variable hole measured across the optical axis, SDY is a minimum dimension of the variable hole measured across the optical axis, EPDX is a maximum dimension of the entrance pupil measured across the optical axis, EPDY is a minimum dimension of the entrance pupil measured across the optical axis, PL is the length of the reflective element, and PH is a height of the reflective element that equals a length of a side of the emitting surface wherein the side of the emitting surface is perpendicular to the incident surface.

7. A lens module, comprising:
a plurality of lenses;
an annular body; and
a reflective element;

wherein the reflective element, the lenses and the annular body are sequentially arranged along an optical axis from an object side to an image side;

wherein the reflective element is disposed between the object side and the lenses, and the reflective element comprises a reflective surface;

wherein the annular body is disposed between the object side and the lenses, between the lenses, or between the lenses and the image side;

wherein the annular body is an aperture or a light-shielding element, the light-shielding element comprises a variable hole;

wherein the lens module satisfies at least one of following conditions:

$0.2<SDX/STD<2$;

$0<SDY/STD<1.2$;

$0.2<EPDX/STD<2.1$;

$0<EPDY/STD<1.5$;

0.7 mm$<$EPA$/STD<$10 mm;

0.5 mm$<$EPA$/PL<$5.5 mm;

$0<SDX/EPDX<1.6$;

$0.5<SDY/EPDY<2.3$;

1 mm$<SA/STD<$9 mm;

$0.4<SA/$EPA$<2.4$;

where SDX is a maximum dimension of the variable hole measured across the optical axis, SDY is a minimum dimension of the variable hole measured across the optical axis, STD is a diameter of the aperture, EPDX is a maximum dimension of an entrance pupil measured across the optical axis, EPDY is a minimum dimension of the entrance pupil measured across the optical axis, PL is a length of the reflective element, the reflective surface comprises a side, the length of the reflective element equals a length of the side of the reflective surface, the side of the reflective surface is perpendicular to the optical axis, SA is an area of the variable hole of the light-shielding element, and EPA is an area of the entrance pupil of the lens module.

8. A lens module, comprising:
a plurality of lenses;
an annular body; and
a reflective element;

wherein the reflective element, the lenses and the annular body are sequentially arranged along an optical axis from an object side to an image side;

wherein the reflective element is disposed between the object side and the lenses, and the reflective element comprises a reflective surface;

wherein the reflective element further comprises an incident surface and an emitting surface which are perpendicular to each other;

wherein the annular body is disposed between the object side and the lenses, between the lenses, or between the lenses and the image side;

wherein the annular body is an aperture or a light-shielding element, the light-shielding element comprises a variable hole;

wherein the lens module satisfies at least one of following conditions:

$0.8 < PL/EPDX < 4;$ $0.7 < PH/EPDY < 3;$ $0.5 \text{ mm} < EPA/PL < 5.5 \text{ mm};$ $0.8 < (SDY+EPDY)/PH < 2;$ $0.5 < (SDX+EPDX)/PL < 2.2;$ $2 < (SDX/SDY)+(EPDX/EPDY)+(PL/PH) < 6.5;$ where PL is a length of the reflective element, the reflective surface comprises a side, the length of the reflective element equals a length of the side of the reflective surface, the side of the reflective surface is perpendicular to the optical axis, EPA is an area of an entrance pupil of the lens module, PH is a height of the reflective element that equals a length of a side of the emitting surface wherein the side of the emitting surface is perpendicular to the incident surface, SDX is a maximum dimension of the variable hole measured across the optical axis, SDY is a minimum dimension of the variable hole measured across the optical axis, EPDX is a maximum dimension of the entrance pupil measured across the optical axis, and EPDY is a minimum dimension of the entrance pupil measured across the optical axis.

9. The lens module as claimed in claim 8, wherein the annular body is an aperture or a light-shielding element, the light-shielding element comprises an action element, a variable hole and a driving element, and the action element surrounds the optical axis to form the variable hole and is driven by the driving element to change an inner diameter of the variable hole.

10. The lens module as claimed in claim 9, wherein at least one of the lenses is movable so that the lens module can zoom, and the action element is driven to change the inner diameter of the variable hole when the lens module zooms.

11. The lens module as claimed in claim 9, wherein the aperture has a fixed size.

12. The lens module as claimed in claim 9, wherein the light-shielding element is movable along the optical axis.

13. The lens module as claimed in claim 9, wherein the action element is a non-circular sheet.

14. The lens module as claimed in claim 10, wherein the variable hole is non-circular.

15. The lens module as claimed in claim 14, wherein the variable hole is in a shape of polygon, polygon with sides symmetrically arranged with respect to the optical axis, polygon with sides asymmetrically arranged with respect to the optical axis, track of sports field, bottle, oak-barrel, waves, flower, leaf, cloud, star, serration, or heart.

16. The lens module as claimed in claim 14, wherein the variable hole is in a shape that comprises a straight line and an arc.

17. The lens module as claimed in claim 14, wherein the variable hole is in an irregular shape that consists of lines connected to each other.

18. The lens module as claimed in claim 12, wherein the inner diameter of the variable hole is changed in accordance with different focal lengths.

19. The lens module as claimed in claim 18, wherein the shape of the action element may consist of a plurality of line segments, may consist of a plurality of arcs, may consist of line segments and arcs, may consist of a plurality of curved lines, or may consist of line segments, arcs and curved lines.

* * * * *